(12) United States Patent
Buzruk et al.

(10) Patent No.: US 10,047,018 B2
(45) Date of Patent: Aug. 14, 2018

(54) COMPOSTING DEVICE SLIDING LID WITH A SEAL ASSEMBLY

(71) Applicant: WHIRLPOOL CORPORATION, Benton Harbor, MI (US)

(72) Inventors: Abhishek Buzruk, Maharashtra (IN); Christopher C. Wilcox, Stevensville, MI (US); Brian Clark, Ankeny, IA (US)

(73) Assignee: Whirlpool Corporation, Benton Harbor, MI (US)

( * ) Notice: Subject to any disclaimer, the term of this patent is extended or adjusted under 35 U.S.C. 154(b) by 235 days.

(21) Appl. No.: 15/065,004

(22) Filed: Mar. 9, 2016

(65) Prior Publication Data
US 2017/0260110 A1  Sep. 14, 2017

(51) Int. Cl.
*B65D 43/20* (2006.01)
*C05F 17/00* (2006.01)
*C05F 17/02* (2006.01)

(52) U.S. Cl.
CPC .......... *C05F 17/0205* (2013.01); *B65D 43/20* (2013.01); *C05F 17/0258* (2013.01); *B01L 2300/041* (2013.01)

(58) Field of Classification Search
CPC .............. C05F 17/0205; C05F 17/0258; C05F 17/0264; B65D 43/20; C12M 23/48; C12M 23/50; C12M 23/46
See application file for complete search history.

(56) References Cited

U.S. PATENT DOCUMENTS

| | | | |
|---|---|---|---|
| 4,878,596 A | 11/1989 | Cawley et al. |
| 5,775,579 A | 7/1998 | Kardum et al. |
| 5,955,161 A | 9/1999 | Tropsha |
| 6,165,566 A | 12/2000 | Tropsha |
| 6,284,528 B1 | 9/2001 | Wright |
| 7,422,022 B2 | 9/2008 | Maunsell et al. |
| 7,611,891 B2 | 11/2009 | Sundberg |
| 8,129,177 B2 | 3/2012 | Cohn |

(Continued)

FOREIGN PATENT DOCUMENTS

| | | |
|---|---|---|
| CN | 204999819 U | 1/2016 |
| DE | 7417538 U | 3/1974 |

(Continued)

OTHER PUBLICATIONS

European Search Report for Counterpart EP17157258.9, dated Jul. 12, 2017.

(Continued)

*Primary Examiner* — Nathan Andrew Bowers

(57) ABSTRACT

The disclosure relates to a composting device including a housing defining an interior with an access opening providing access to the interior, a composter bin located within the interior and in communication with the access opening, and a cover slidably mounted to the housing and slidable along a sliding path between opened and closed conditions to selectively open and close the access opening. An angled seal assembly is provided on the cover and housing. Both a sealing surface and a seal are angled relative to a sliding path such that the space between the seal and the sealing surface decreases as the cover is slid from the opened to the closed condition.

23 Claims, 6 Drawing Sheets

(56) References Cited

U.S. PATENT DOCUMENTS

| | | | |
|---|---|---|---|
| 2005/0115595 A1* | 6/2005 | Cerruti | A47L 15/4409 |
| | | | 134/93 |
| 2008/0115813 A1 | 5/2008 | Cosgrove | |
| 2012/0285209 A1* | 11/2012 | Bassile | C05F 17/0223 |
| | | | 71/8 |
| 2013/0217111 A1 | 8/2013 | Chang | |

FOREIGN PATENT DOCUMENTS

| | | |
|---|---|---|
| DE | 2947297 A1 | 5/1981 |
| DE | 19803374 A1 | 8/1999 |
| EP | 0103753 A2 * | 3/1984 |
| JP | 53101862 A * | 9/1978 |
| KR | 20110073656 A | 6/2011 |

OTHER PUBLICATIONS

US File History for U.S. Appl. No. 15/158,660, filed May 19, 2016 entitled "Composting Device with Door and Fascia".
US File History for U.S. Appl. No. 15/158,958, filed May 19, 2016 entitled "Composting Device with Funnel Assembly".

* cited by examiner

COMPOSTING DEVICE SLIDING LID WITH A SEAL ASSEMBLY

BACKGROUND

Composting devices are known to implement a composting cycle for biologically and chemically decomposing organic material, such as food waste, into compost for use as a fertilizer and soil amendment. The composting cycle can be implemented in a composting bin by providing water, heat and aeration to the refuse, and can require a period of time for completion. During this period of time odors can escape from the lid or cover of the composting device.

BRIEF SUMMARY

In one aspect, a composting device includes a housing defining an interior with an access opening providing access to the interior, a composter bin located within the interior and in communication with the access opening, and a cover slidably mounted to the housing and slidable along a sliding path between opened and closed conditions to selectively open and close the access opening. A seal assembly comprising a seal is provided on the cover with a sealing surface provided on the housing about the access opening. The sealing surface is angled relative to the seal along the direction of the sliding path such that the space between the seal and the sealing surface decreases as the cover is slid from the opened to the closed condition, and the seal abuts the sealing surface in the closed condition to seal the cover relative to the housing.

In another aspect, a composting device includes a housing defining an interior with an access opening providing access to the interior, a composter bin located within the interior and in communication with the access opening, and a cover slidably mounted to the housing and slidable along a sliding path between opened and closed conditions to selectively open and close the access opening. A seal assembly comprising a seal is provided on one of the cover and housing and a sealing surface is provided on the other of the cover and housing. Both the sealing surface and the seal are angled relative to the sliding path such that the space between the seal and the sealing surface decreases as the cover is slid from the opened to the closed condition, and the seal abuts the sealing surface in the closed condition to seal the cover relative to the housing.

DETAILED DESCRIPTION

Figure 1:
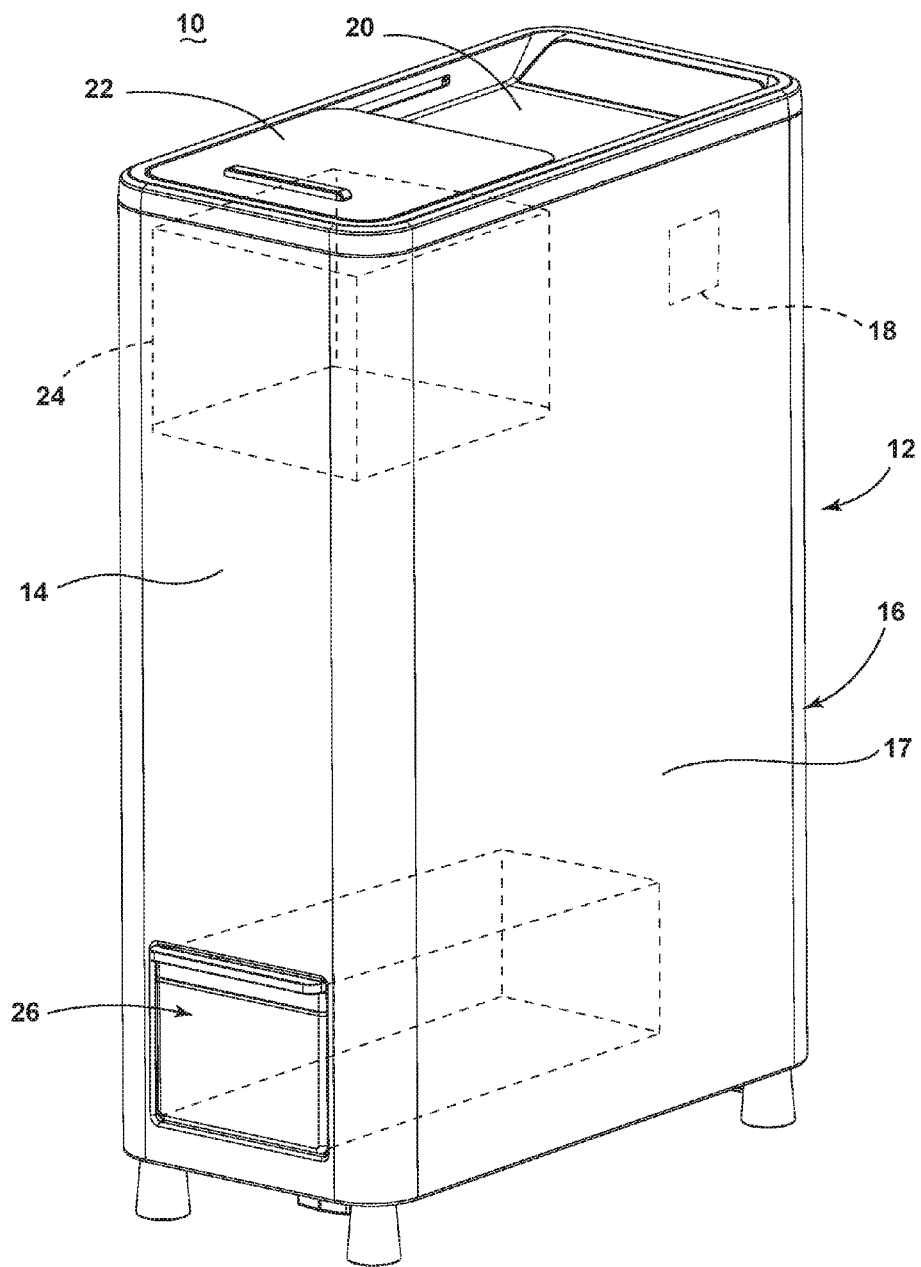
FIG. 1 is a perspective view of a composting device.

FIG. 1 illustrates a perspective view of a composting device 10 or a food recycler for transforming organic material into compost by way of a composting cycle of operation. The composting device 10 can include a housing 12 defining an interior having a front wall 14 spaced from a back wall 16, a pair of side walls 17, and a controller 18 located within the housing 12.

A top wall 20 can enclose the housing 12 at the top of the front wall 14, back wall 16, and the pair of side walls 17. The housing 12 can be any structure for enclosing, supporting and protecting the electrical and mechanical components of the composting device 10 including, but not limited to a cabinet and a frame.

The housing 12 further comprises a lid assembly 28 which can include the top wall 20 and a cover 22 slidably mounted to the housing 12 for sliding movement between open or closed positions to enable access to the interior of the composting device 10. The cover 22 can be any barrier that provides selective access for inputting organic material into the composting device 10, including, but not limited to a hingedly, slidably or removably mounted cover, drawer, panel or lid. While shown in FIG. 1 as coupled to the top wall 20, the cover 22 can be mounted to any exterior wall enclosing the housing 12 including, but not limited to the front wall 14. The top wall 20, as well as the remainder of the housing 12, can be formed of any material suitable for construction of the housing structure including, but not limited to metal such as steel or steel alloy, plastic, composite materials such as a hardened polymer composite material and combinations thereof. Some models of composting devices 10 can include decorative panels that can be mounted on the housing 12 or one or more walls.

When in the open position, the cover 22 provides access to the interior of the housing 12. In the open position, the cover can further expose any element of the composting device 10 interior of the housing 12 including but not limited to one or more water fill inlets for supplying water to the composting device 10 and one or more enzyme dispenser inlets. A composter bin 24 is provided within the housing 12. The composter bin 24 can be disposed beneath the cover 22 such that the cover provides selective access to the composter bin 24 as the cover is opened/closed.

An access drawer 26 is provided and slides in or out through an opening in the front wall 14. The access drawer 26 is a drawer slidably mounted to the housing 12 on a horizontal axis for movement between open and closed positions. It will be understood, however, that access to the interior of the composting device 10 via the front wall 14 can be provided in other ways, including but not limited to, a cover pivotally connected to the front wall 14. The access drawer can be detachably mounted to an internal side of the housing 12 and is accessible from outside the housing 12. The access drawer 26 can be removable from the interior of the housing 12 so that the contents thereof can be discharged at will by a user, as for example, by dumping the contents of the drawer 26 onto a garden.

Figure 2:
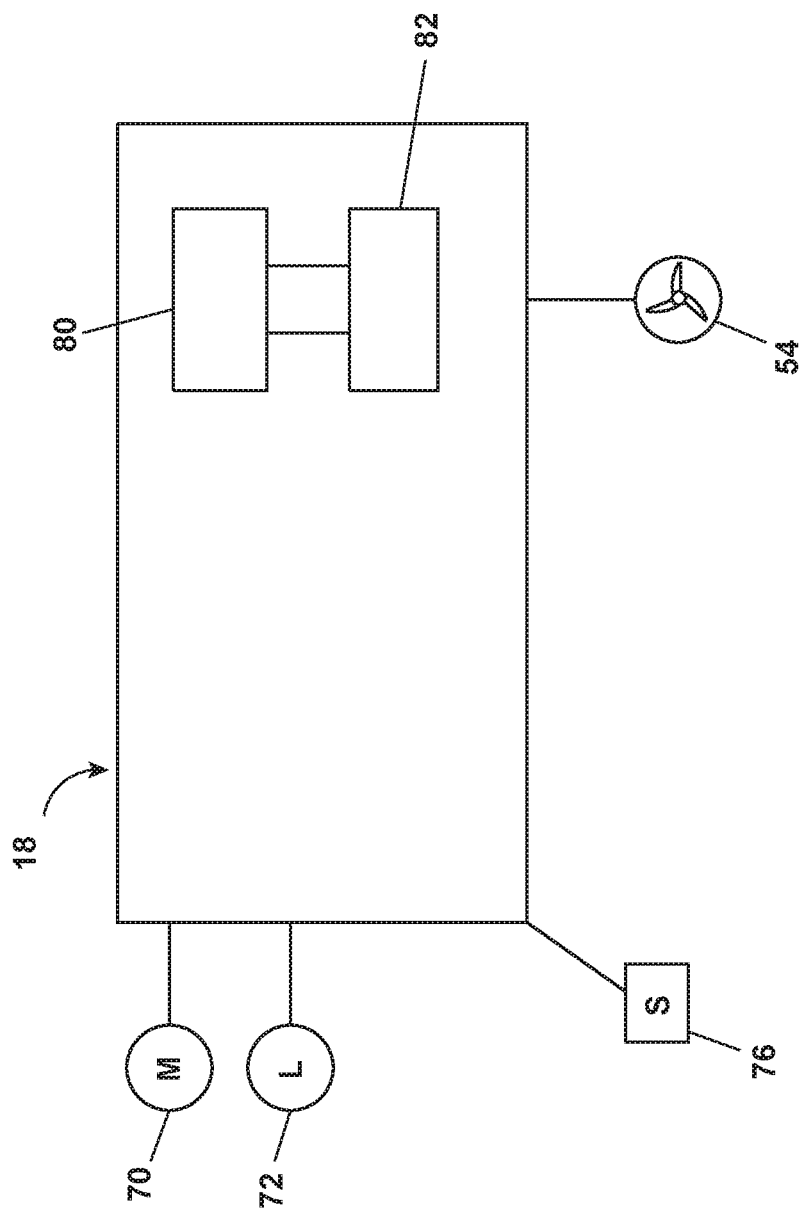
FIG. 2 is a block diagram of a control system of the composting device.

Referring now to FIG. 2, a schematic of the controller 18 for controlling the operation of the composting device 10 is illustrated. The controller 18 can be provided with a memory 80 and a central processing unit (CPU) 82. The memory 80 can be used for storing the control software that is executed by the CPU 82 in completing a cycle of operation using the composting device 10 and any additional software. The memory 80 can also be used to store information, such as a database or table, and to store data received from one or more components of the composting device 10 that can be communicably coupled with the controller 18.

The controller 18 can be operably coupled with one or more components of the compositing device 10 for communicating with and controlling the operation of the component to complete a cycle of operation. For example, the controller 18 can be operably coupled with a motor 70 to control the operation of the motor 70. In another example, the controller 18 can be operably coupled to a fan 54. The controller 18 can also be coupled with one or more sensors 76 provided in one or more of the systems of the composting device 10 to receive input from other sensors in the composting device 10. The controller 18 can also be operably coupled to a lid switch 72 to control locking the composting device 10 when in operation and unlocking the composting device 10 when a cycle has completed.

Figure 3:
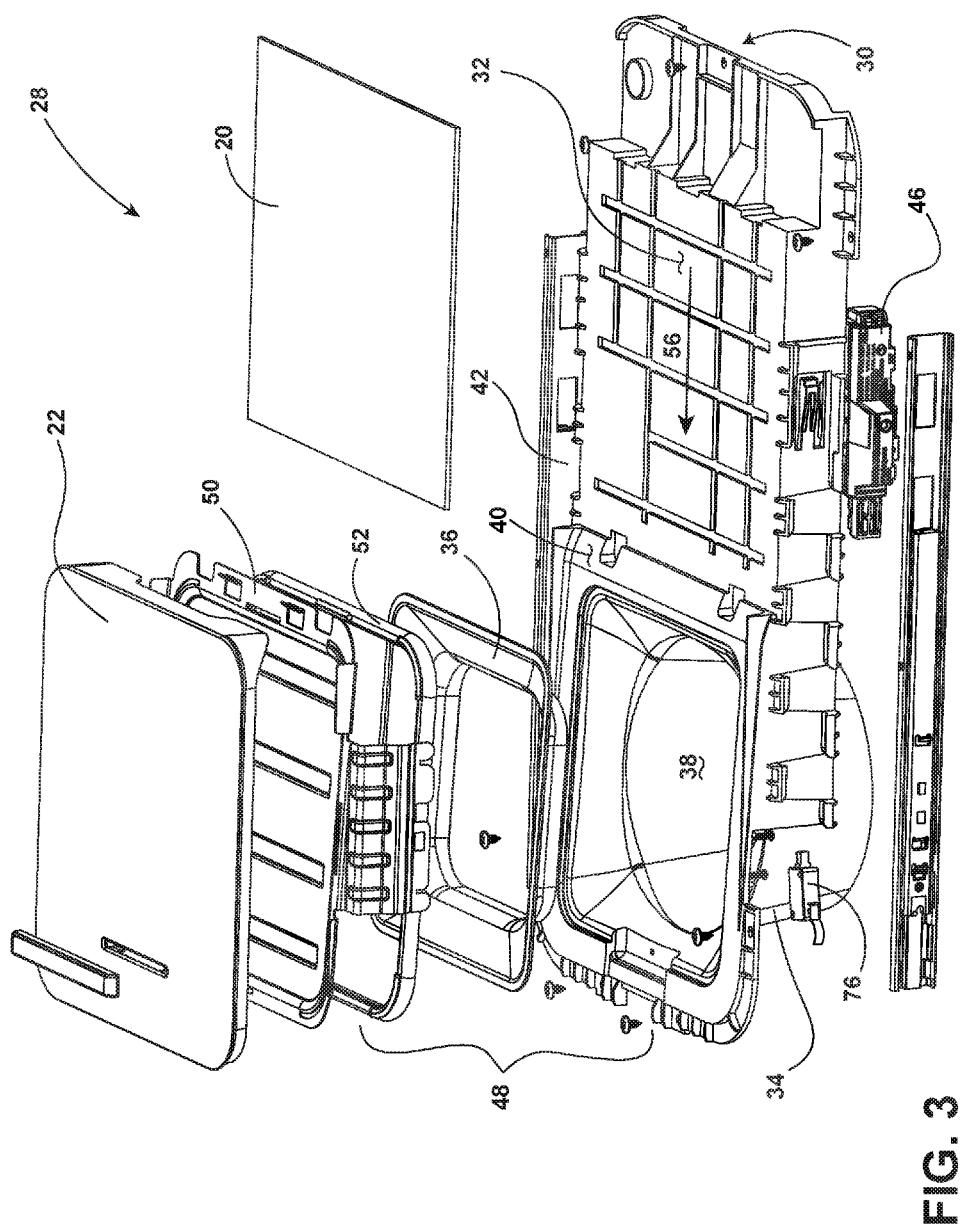
FIG. 3 is an exploded view of a lid assembly of the composting device.

FIG. 3 details the components of the lid assembly 28 of the composting device 10 in an exploded view. The lid assembly 28 includes a removable end plate 30 comprising a barrier portion 32 and a funnel 34. The funnel 34 defines an access opening 38 providing communication with the composter bin 24. A sealing surface 40 extends about the access opening 38 and, in some configurations, define the access opening 38. A trim bezel 36 can be placed on the funnel 34 and is illustrated as being within the sealing surface 40. The trim bezel 36 can have an access opening that is complementary to the access opening 38 such that they collectively define the access opening 38 when the trim bezel 36 is provided on the funnel 34.

A slide assembly in the form of a carriage 50 slidably mounted to slide rails slidably mounts the cover 22 to the removable end plate 30. The carriage 50 is mounted to the bottom of the cover 22 and the slide rails 42 are mounted to the removable end plate 30. The slide-assembly can be self-closing to provide for the automatic closing of the access opening 38 with the cover 22. The slide rails 42 define a horizontal sliding path 56 for the cover 22 between opened (FIG. 5) and closed conditions to selectively open and close the access opening 38. The removable end plate 30 can also provide mounting fixtures for a lid lock 46 controlled by the lid switch 72.

The lid assembly 28 further comprises a seal assembly 48 including the sealing surface 40 and a seal 52 mounted to the carriage 50. In one implementation, the seal 52 is compressible and complementary in orientation to the sealing surface 40 and is coated in an anti-friction coating.

Figure 4:
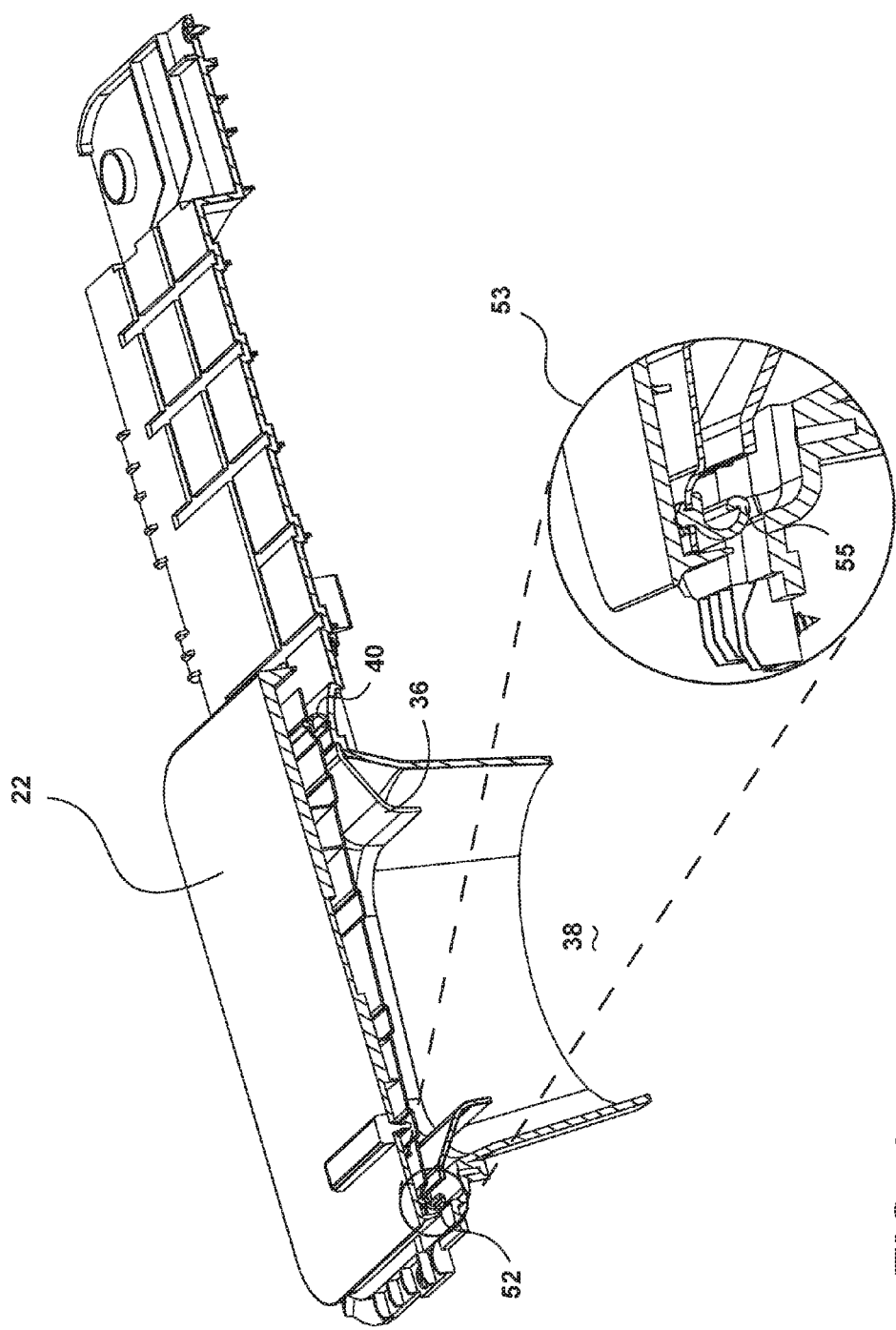
FIG. 4 is a cross-sectional perspective view of the lid assembly from FIG. 3.

When the cover 22 is in the closed position, the seal 52 abuts the sealing surface 40 as seen in FIG. 4. It is contemplated that the seal 52 will seal the sealing surface 40 about the entire access opening 38. It is further contemplated that the seal 52 is compressed at all locations where the seal is abutting the sealing surface 40. In the illustrated example, the seal occurs between the seal 52 and the sealing surface 40 and not the seal 52 and the trim bezel 36 to ensure a sealed surface is formed with or without the trim bezel 36 in place. However, the sealing surface 40 could be formed as part of the trim bezel 36 if desired.

As is best seen in the call out 534 of FIG. 4, the seal 52 has a G-shape cross-section, which terminates internally in a tail 55. The seal 52 abuts the sealing surface 40 in the closed condition to seal the cover 22 relative to the housing 12. The seal 52 is oriented relative to the access opening 38 such that the tail 55 of the G is always pointed towards the access opening 38. When the cover 22 is closed, the G-shaped cross section folds in on itself becoming more compressed creating a seal with the sealing surface 40.

Figure 5:
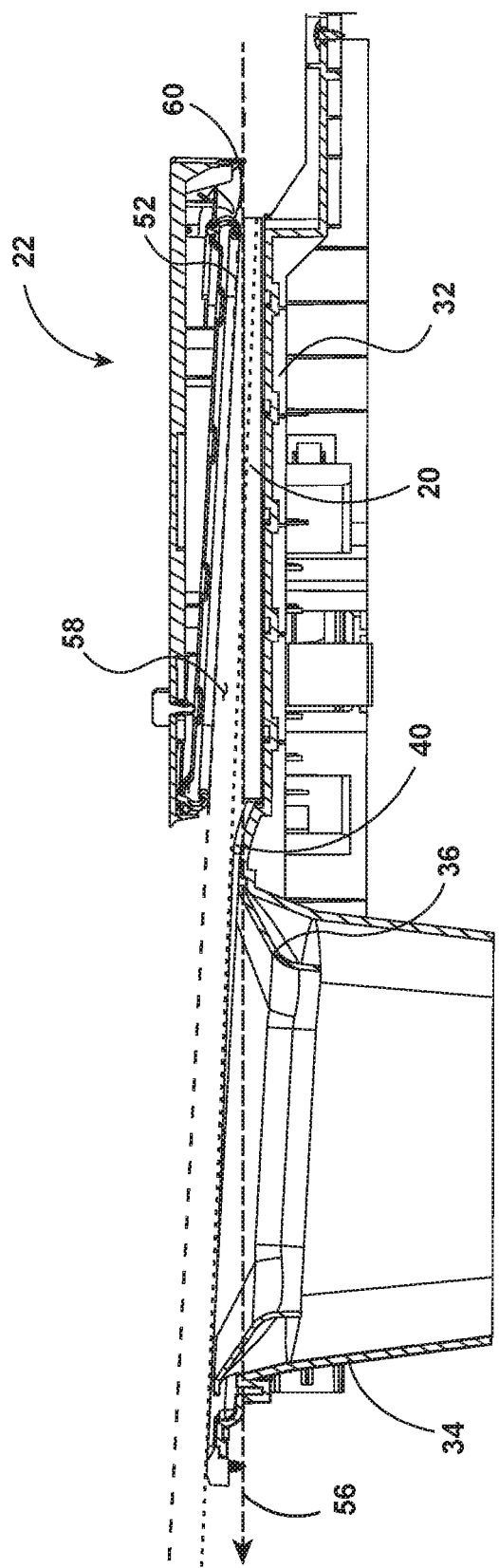
FIG. 5 is a cross-sectional view of the lid assembly of FIG. 3.

Turning now to FIG. 5, a sliding path 56 running horizontal illustrates the direction in which the cover 22 slides when moving to a closed position. The sealing surface 40 and seal 52 are both angled in the same direction relative to the sliding path 56. A lower peripheral edge 60 of the seal 52 and the sealing surface 40 are both angled upwardly away from the sliding path 56. These angles can be different angles so that one is greater than the other, or the same angle, so the seal 52 and sealing surface 40 run parallel to each other. When the cover 22 is in an open position a space 58 between the seal 52 and sealing surface 40 exists. This space 58 decreases as the cover 22 slides closed.

Figure 6A:
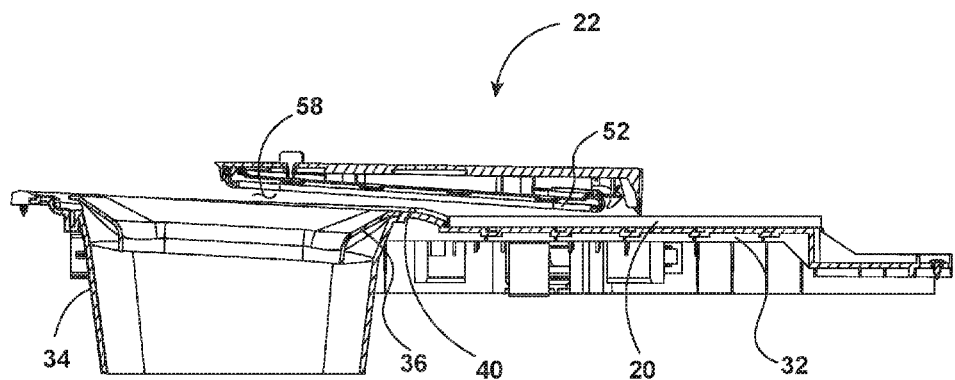
FIG. 6A is a cross-sectional view of the lid assembly of FIG. 3 in a closing position.
Figure 6B:
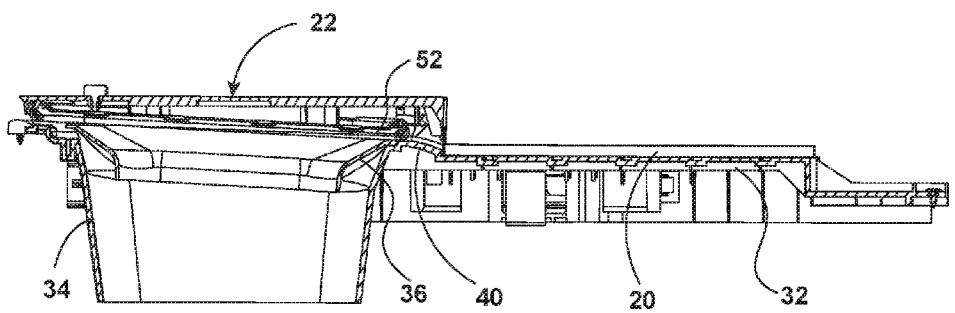
FIG. 6B is a cross-sectional view of the lid assembly of FIG. 3 in a closed position.

FIGS. 6A and B show the cover 22 sliding into a closed position along the sliding path 56. As the cover 22 moves along the sliding path 56 from the opened position to the closed position the seal 52 and sealing surface 40 become closer and closer to each other until they abut up against each other forming a sealed closure. The sealed closure is formed when the entire seal 52 is adjacent the sealing surface 40 so that the space 58 becomes zero only at the closed position.

The cover 22 can be locked automatically in the closed position when the compost device 10 is in operation. The lid switch 72 is actuated and sends a signal to the lid lock 46 when the cover 22 is in the closed position and the compost device 10 is in operation. When a cycle of operation has completed, the lid switch 72 actuates the lid lock 46 again to disengage allowing access to the compost device 10. The lid lock prevents access to the composter bin during operation.

Benefits of the seal assembly include a sealing geometry which creates an air tight seal preventing unpleasant odor from escaping while a user is not requiring access to the composter bin. Coating the seal in an anti-friction coating allows for ease of sliding when a user requires access to the composter bin and when closing the composter bin for operation. The entire seal forms a seal closure at about the same time so that no portion of the seal is in contact with the sealing surface for a longer amount of time than the other, eliminating excessive wear on the portion of the seal that would otherwise first come into contact with the sealing surface.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are covered by this disclosure.

This written description uses examples to disclose embodiments of the invention, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A composting device comprising:
   a housing defining an interior, and having an access opening providing access to the interior;

a composter bin located within the interior and in communication with the access opening;

a cover slidably mounted to the housing and slidable along a sliding path between opened and closed conditions to selectively open and close the access opening;

a seal assembly comprising a constant-height seal provided on the cover and a sealing surface provided on the housing about the access opening;

wherein the sealing surface and the seal are angled relative to the direction of the sliding path such that the space between the seal and the sealing surface decreases as the cover is slid from the opened to the closed condition, and the seal abuts the sealing surface in the closed condition to seal the cover relative to the housing.

2. The composting device of claim 1 wherein the seal surface completely surrounds the access opening.

3. The composting device of claim 2 wherein the seal and seal surface are complementary in shape.

4. The composting device of claim 1 wherein the seal is compressible.

5. The composting device of claim 4 wherein the seal has a G-shape cross section.

6. The composting device of claim 1 further comprising rails slidably mounting the cover to the housing.

7. The composting device of claim 6 wherein the housing comprises a removable end plate in which the access opening is provided and to which the rails are mounted.

8. The composting device of claim 1 further comprising a funnel mounted to the housing and defining the access opening.

9. The composting device of claim 1 wherein the cover is slidably mounted such that the sliding path is horizontal.

10. The composting device of claim 1 wherein the sealing surface is angled upwardly away from the sliding path.

11. The composting device of claim 9 wherein a lower peripheral edge of the seal is angled upwardly away from the sliding path.

12. The composting device of claim 1 wherein the seal is angled relative to the sliding path.

13. The composting device of claim 12 wherein the seal and sealing surface are angled the same direction relative to the sliding path.

14. The composting device of claim 13 wherein one of the seal and sealing surface is at a greater angle than the other.

15. A composting device comprising:
a housing defining an interior, and having an access opening providing access to the interior;

a composter bin located within the interior and in communication with the access opening;

a cover slidably mounted to the housing and slidable along a sliding path between opened and closed conditions to selectively open and close the access opening; and a seal assembly comprising a constant-height seal provided on one of the cover and housing and a sealing surface provided on the other of the cover and housing;

wherein both the sealing surface and the seal are angled relative to the sliding path such that the space between the seal and the sealing surface decreases as the cover is slid from the opened to the closed condition, and the seal abuts the sealing surface in the closed condition to seal the cover relative to the housing.

16. The composting device of claim 15 wherein the seal and sealing surface are angled the same direction relative to the sliding path.

17. The composting device of claim 16 wherein one of the seal and sealing surface is angled greater than the other.

18. The composting device of claim 15 wherein the seal is compressible.

19. The composting device of claim 18 wherein the seal has a G-shaped cross section.

20. The composting device of claim 15 wherein the sealing surface surrounds the access opening.

21. The composting device of claim 20 wherein the sealing surface and seal are complementary in shape.

22. The composting device of claim 15 further comprising a funnel mounted to the housing.

23. The composting device of claim 22 wherein the funnel defines the access opening.

* * * * *